(12) United States Patent
Chattopadhyay et al.

(10) Patent No.: US 9,076,071 B2
(45) Date of Patent: Jul. 7, 2015

(54) LOGO RECOGNITION

(75) Inventors: Tanushyam Chattopadhyay, Kolkata (IN); Aniruddha Sinha, Kolkata (IN); Arpan Pal, Kolkata (IN); Debabrata Pradhan, Kolkata (IN); Soumali Roychowdhury, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 74 days.

(21) Appl. No.: 13/977,914

(22) PCT Filed: Jan. 3, 2012

(86) PCT No.: PCT/IN2012/000006
§ 371 (c)(1),
(2), (4) Date: Sep. 12, 2013

(87) PCT Pub. No.: WO2012/093407
PCT Pub. Date: Jul. 12, 2012

(65) Prior Publication Data
US 2014/0016864 A1    Jan. 16, 2014

(30) Foreign Application Priority Data
Jan. 4, 2011 (IN) .............................. 22/MUM/2011

(51) Int. Cl.
G06K 9/62 (2006.01)
H04N 21/2389 (2011.01)
G06K 9/32 (2006.01)
H04N 21/8358 (2011.01)
H04N 21/414 (2011.01)

(52) U.S. Cl.
CPC ........ *G06K 9/6202* (2013.01); *H04N 21/23892* (2013.01); *H04N 21/8358* (2013.01); *H04N 21/41407* (2013.01); *G06K 9/3266* (2013.01)

(58) Field of Classification Search
CPC .............. G06K 9/3266; G06K 9/6202; H04N 21/2392; H04N 21/41407; H04N 21/8358
USPC ......................................... 382/165, 218, 278
See application file for complete search history.

(56) References Cited

U.S. PATENT DOCUMENTS 7,020,336 B2 * 3/2006 Cohen-Solal et al. ........ 382/204
8,175,413 B1 * 5/2012 Ioffe et al. .................... 382/283
8,359,616 B2 * 1/2013 Rosenberg et al. ............. 725/42

OTHER PUBLICATIONS

T. Chattopadhyay et al. (Electronic Program Guide for RF fed TV Channels, 2010, IEEE, pp. 158-163).*

* cited by examiner

*Primary Examiner* — Kanjibhai Patel
(74) *Attorney, Agent, or Firm* — Seed IP Law Group PLLC

(57) ABSTRACT

A computerized method for recognition of a logo is described herein. The method comprises obtaining a plurality of feed frame of a feed video wherein the feed video has a logo embedded therein. At least one feed frame from the plurality of feed frames is compared with each template from a plurality of templates. For each template compared with the feed frame, a correlation parameter is computed and the logo is recognized based on the computing.

15 Claims, 4 Drawing Sheets

LOGO RECOGNITION

TECHNICAL FIELD

The subject matter described herein, in general, relates to recognition schemes and in particular to recognition of logo of a channel.

BACKGROUND

With the advent of technology, visual media, and in particular television, has become the most widely used source of entertainment among the masses. Television network service providers make channels available to the viewers either by analog transmission or by digital transmission. The channels transmitted by the television network service providers are received by reception systems, such as television sets or set-top boxes, at the viewers' end. Each channel generally has a logo embedded within a transmission stream so that the viewers can identify the channel that they are viewing.

Conventional reception systems include various recognition schemes to achieve logo recognition for different purposes. In the conventional reception systems, in one example, the logo is recognized by a reception system to ascertain whether the logo is present in a transmitted video or not. If the reception system ascertains that the logo is absent, then it is assumed that the transmission has been disrupted, for example, because of one or more advertisements. Further, a recording system associated with the reception system may be configured to interrupt recording of the transmitted video for the duration when the logo is absent in the transmitted video.

The conventionally used recognition schemes are usually based on template matching techniques in which all the pixels in a frame of the transmitted video are compared with the corresponding pixels of a plurality of previously stored templates. In few other conventional schemes, the pixels lying in a region of interest (ROI) are compared with a plurality of previously stored templates. Such conventional schemes of logo recognition do not consider the effects of transparent background of the logos and non-static pixels in the ROI in certain channels.

SUMMARY

This summary is provided to introduce concepts related to logo recognition. These concepts are further described below in the detailed description. This summary is not intended to identify essential features of the claimed subject matter nor is it intended for use in determining or limiting the scope of the claimed subject matter.

The subject matter described herein relates to a computerized method for recognition of a logo is described herein. The method comprises obtaining a plurality of feed frames of a feed video, wherein the feed video has a logo embedded therein. At least one feed frame from the plurality of feed frames is compared with each template from a plurality of templates. For each template compared with the feed frame, a correlation parameter is computed and the logo is recognized based on the computing.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
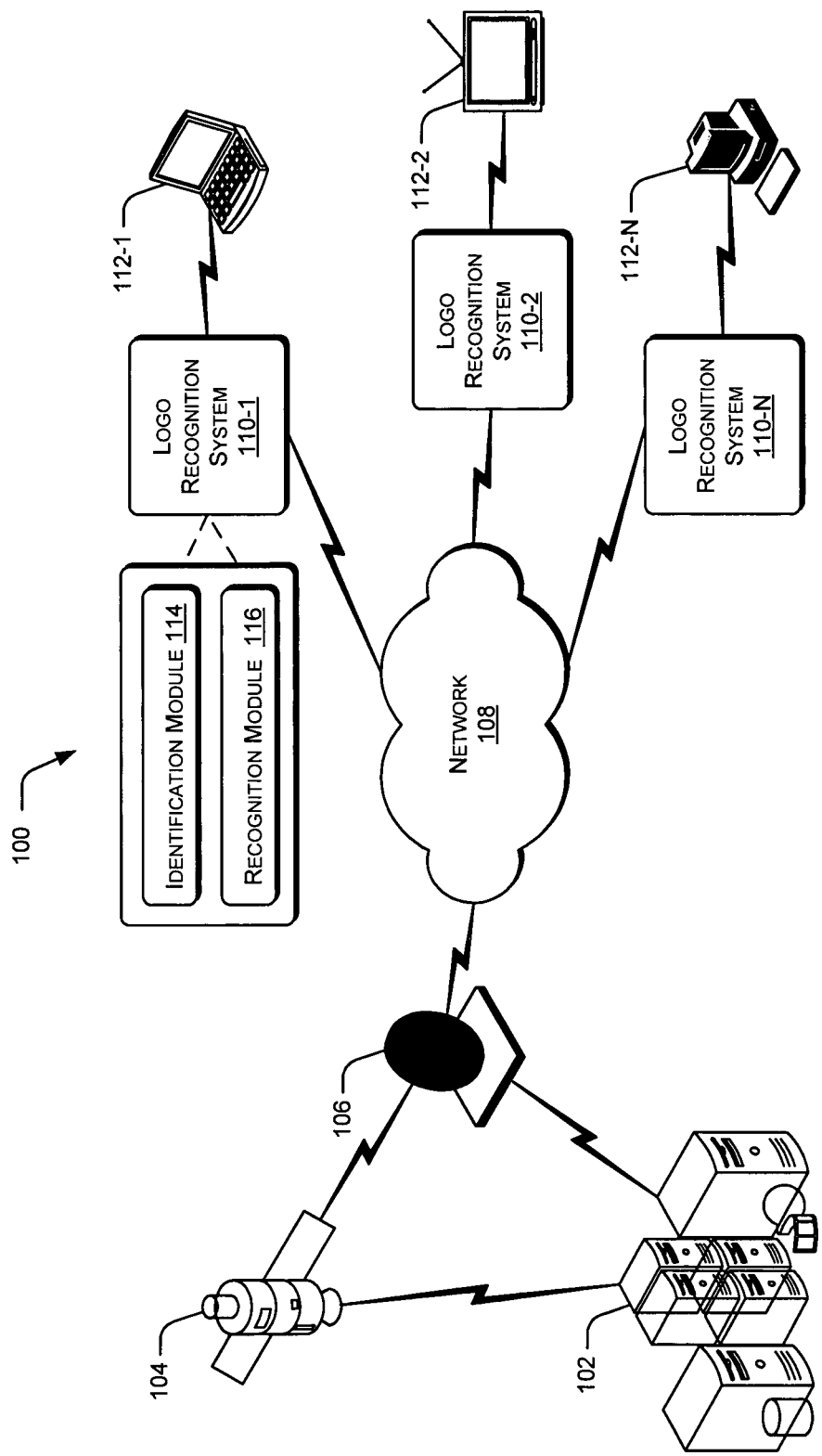
FIG. 1 illustrates an exemplary network environment implementation of a logo recognition system, in accordance with an embodiment of the present subject matter.

The subject matter described herein relates to logo recognition. Systems and methods related to logo recognition, described herein, can be implemented in a transmission or a reception system including a variety of devices, such as a set-top boxes, base transceiver systems (BTS), computing devices, televisions, mobile phones, laptops, personal digital assistants (PDAs), and so on.

Conventional logo recognition schemes are usually based on template matching techniques, in which pixels in a frame of a video or pixels in a region of interest (ROI) of the frame are compared with a plurality of pre-stored templates. For example, each line of pixels in the ROI is scanned to identify similar pixels or a block of pixels in the templates. However, in certain channels, the logos have a transparent background. In such cases, some of the pixels in the ROI of the video under consideration are not static and are constantly changing. For such logos, the recognition is typically erroneous as conventional template matching techniques for recognizing logos compare all the pixels in the ROI to the pixels in the templates.

Conventional reception systems implementing digital transmission and reception include logos and information relevant to the logos, for example, electronic programming guide (EPG) of a channel, embedded along with received digital video signals. However, the inclusion of such information in analog signals is not feasible.

The embodiments described herein illustrate methods and systems for logo recognition, for example, for analog transmission. According to an embodiment, a template database is created, which includes templates corresponding to each channel provided by a television network service provider and stored in a channel file. In said embodiment, a specimen video of all the channels listed in the channel file is recorded for a period of about 5 to 10 seconds. In another embodiment, the specimen video can be recorded for a longer duration of about 10 to 15 minutes to reduce errors during logo recognition. During the recording of the specimen video, a plurality of frames of the specimen video is recorded.

Further, in an implementation, a region including the static pixels is either manually marked as region of interest (ROI) for each specimen video through peripheral devices, such as a mouse or a keyboard, or is automatically identified by the system. It will be understood that the ROI identified or marked for a specimen video is also the ROI for each of the frames of the specimen video. In another implementation, during the recording of the specimen videos of the channels, only the ROIs in the specimen videos are recorded for the channels.

Once the ROI is identified and marked, a quantization of colours of the pixels is achieved. The quantization of colours can be understood as the quantization of values of different colours. In one example, the colours of the pixels in the ROI, initially represented in a UYVY colour format, are converted to a hue-saturation-value (HSV) colour space, and are quantized.

In an implementation, after the values of the colours of the pixels are quantized, static and non-static pixels in the ROI are identified and annotated. In said implementation, the static and the non-static pixels for one specimen video corresponding to a channel are identified by stochastic measuring techniques. For example, dispersion of the quantized values of the colours in the HSV colour domain is computed for the pixels in the ROI in various frames. In said example, if the value of dispersion of the colour a pixel is less than a threshold value of dispersion, it means that the colour of the pixel remains static in time, and hence, the pixel is a part of the logo. Such a pixel is annotated as a pixel of interest (POI). On the other hand, if the value of dispersion of the colour of the pixel is greater than the threshold value of dispersion, it means that the colour of the pixel changes temporally, and hence, the pixel may be a part of the transparent background of the logo. Such a pixel is annotated as a "white" pixel.

In one implementation, the pixels annotated as the POIs in the ROI of the specimen video, along with their quantized colours, and the white pixels in the ROI of the specimen video are stored in a template. Further, the template is associated with the channel transmitting that specimen video. The ROI identified or marked in the specimen video, referred to as template ROI, can also be stored along with the template of the channel to which the specimen corresponds. In one example, the coordinates of a boundary delineating the ROI in the specimen video are stored as the template ROI.

The above-mentioned annotation of the pixels as POI and white pixels in the ROI is done for all the specimen videos to complete the creation of the template database having templates for all such channels in the channel file. Further, each template in the template database is associated with a logo ID, which may be further associated with a channel ID stored in the channel file.

In one embodiment, the template database is communicatively coupled to at least one reception device, such as a set-top box, at client/viewer's end. In one example, the reception device operates on analog transmission and receives radio frequency analog signals, for channels from a transmission device. Further, a logo recognition system may be implemented within the reception device.

In an embodiment, when the reception device starts receiving the signals from the transmission device and displays a feed video, for example, on a television screen, the process of logo recognition for the feed video commences. Accordingly, a plurality of frames of the feed video, referred to as feed frames, is stored by the logo recognition system. For the purpose of logo recognition, one feed frame from the plurality of feed frames is compared one by one with the various templates in the template database.

According to an aspect, a region of interest (ROI) is also identified in the feed frame when the comparison between one template in the template database and the feed frame begins. In said implementation, the ROI in the feed frame is identified based on the information associated with the template, for example, the information pertaining to the template ROI.

Further, based on the template to which the feed frame is compared, the POIs in the feed frame are identified. In one example, the same POIs as those stored in the template of the channel are identified as the POIs of the feed frame. It will be understood that the POIs of the feed frame lie in the ROI of the feed frame. Once the POIs of the feed frame are identified, the quantization of colours of the POIs of the feed frame is performed. The quantization of the colours of the POIs of the feed frame may be achieved in the same way as that during the creation of the template database and the quantized colours of the POIs of the feed frame stored.

After the quantization of the colours of the POIs in the feed frame, the feed frames are compared and matched with the template. In said embodiment, based on the matching the feed frame with the template in the template database, a correlation parameter, such as the correlation coefficient, is computed for the template. In one example, the correlation coefficient is indicative of the number of similar or same POIs in the feed frame and the template.

Subsequently, the feed frame is compared to other templates in the database in the same manner as described. According to an aspect, for every comparison between the feed frame and a template in the template database, the ROI and the POIs are identified in the feed frame, and the correlation parameter is computed based on the matching of the POIs of the feed frame and POIs of each of the templates in the template database.

In an embodiment, all the templates for which a value of the correlation parameter exceeds a threshold match value are marked as candidate match templates.

Further, in one implementation, each candidate match template is matched with a predetermined number of the feed frames of the feed video and a logo score is computed for each candidate match template. In one implementation, the logo score is computed based on the value of the correlation parameter in response to each comparison. For example, the logo score of a candidate match template is the number of feed frames from the 8 feed frames for which the correlation parameter, with respect to that candidate match template, is greater than the threshold match value.

Further, in an example, the logo is recognized based on the logo ID associated with the candidate match template having the maximum logo score. Further, in one implementation, based on the logo ID, a match channel/match channel ID is determined from the channel file. Once the match channel is identified, the reception device may be connected with a database of the television network service provider through, for example, the Internet, to obtain an electronic programme guide (EPG) for the match channel.

If, on the other hand, the value of the correlation parameter for all of the templates does not exceed the threshold match value, then the system deduces that the channel relevant to the feed video is either a new channel or an old channel with a new logo. In such a case, the system processes the feed video to create a template for the feed video and stores the template in the template database.

Further, when the logo recognition system identifies a change of channel at the reception device, for example, by the interruption of a first feed video by a blue or a black screen for a predetermined small interval of time before a second feed video is transmitted, the logo recognition is commenced for the second feed video.

While aspects of described systems and methods for logo recognition can be implemented in any number of different computing systems, environments, and/or configurations, the embodiments are described in the context of the following exemplary system architecture(s).

FIG. 1 illustrates an exemplary network environment 100 implementing logo recognition, according to an embodiment of the present subject matter. In said embodiment, the network environment includes one or more broadcasting station servers 102 placed at a broadcasting station. The broadcasting station servers 102 may be used for relaying channel transmissions, for example, by broadcasting, simulcasting, or multicasting transmissions. In one example, the channel transmissions include analog transmissions. The broadcasting station servers 102 may be implemented as any of a variety of conventional computing devices including, for example, a general purpose computing device, multiple networked servers (arranged in clusters or as a server farm), a mainframe, and so forth.

The broadcasting station servers 102 communicate with a communication satellite 104 to relay the channel transmission to an antenna 106. In one embodiment, the antenna 106 is a satellite antenna. In other embodiments, however, the antenna 106 may include other type of antennae. In one example, the antenna 106 is a television service provider's dish antenna to provide television network connections to various users. Further, it will be understood that the network environment 100 may include a plurality of antenna 106 to receive the channel transmissions from various broadcasting stations.

Further, the antenna 106 is connected over a network 108 to one or more logo recognition systems 110-1, 110-2 . . . 110-N, collectively referred to as logo recognition systems 110 and individually referred to as a logo recognition system 110. For example, the antenna 106 is connected to the logo recognition systems 110 through a transmitting device (not shown). The logo recognition systems 110 include, but are not limited to, set-top boxes, television-tuner cards, base transceiver system (BTS), computing devices, televisions, laptops, personal digital assistants (PDAs), and so on. In one implementation, the logo recognition systems 110 are based on analog transmission. Further, the network 108 may be a wired network implemented on analog transmission and reception. The network 108 may include various devices, such as relay boxes and signal boosters, to connect the antenna 106 to the logo recognition systems 110.

Each of the logo recognition systems 110 are further communicatively coupled to one or more user devices 112-1, 112-2, . . . 112-N, collectively referred to as user devices 112 and individually referred to as a user device 112. The user devices 112 may be implemented as any of a variety of conventional computing devices including, for example, a television set, a desktop PC, a notebook or portable computer, a workstation, a mainframe computer, a mobile computing device, an entertainment device, and an internet appliance. Further, in another embodiment, the logo recognition system 110 is implemented as a multi-port device, such as a relay box, that allows a plurality of user devices 112 to be connected to the logo recognition system 110.

Further, it will also be understood that although the logo recognition system 110 is shown external to the user device 112, the logo recognition system 110 may be integrated and provided internally within the user device 112.

In one embodiment, each logo recognition system 110 is communicatively coupled to a template database (not shown). In one implementation, the template database is created and populated by the logo recognition system 110 for achieving logo recognition. According to an embodiment of the present subject matter, the logo recognition system 110 includes an identification module 114 and a recognition module 116.

In operation, the logo recognition system 110 identifies a logo of a channel relaying a feed video. In one example, the logo may be recognized to identify the channel and to provide an electronic programme guide (EPG) for that channel. In an implementation, the logo recognition system 110 is configured to recognize various types of logos, for example, opaque logos of various shapes and sizes, logos having an opaque foreground and a transparent background, alpha blended logos, static logos with dynamic colours, and animated logos having deterministic pattern of animation. In one example, the logo recognition system 110 is configured to use average frame technique to reduce effect of dynamicity in case of certain logos, such as alpha blended logos, static logos with dynamic colours, and animated logos.

In one implementation, to recognize the logo, the logo recognition system 110 records a sample of the feed video and compares it to templates stored in the template database. In said implementation, the logo recognition system 110 creates and updates the template database with the templates. During the creation of the template database, the logo recognition system 110 records the specimen videos relayed on the various channels, for example, by the television service provider, and displayed on the user device 112. The specimen videos relayed on the channels are usually displayed on the user device 112 in the form of various frames. Further, the identification module 114 identifies one or more regions-of-interest (ROIs) in each specimen video captured by the logo recognition system 110. In one example, the identification module 114 identifies the ROI by comparing all pixels of one frame of the specimen video to all pixels of subsequent frames and by determining static pixels in the frames. In another implementation, the ROI may be manually annotated in each specimen video by an administrator connected to the user device 112 through the logo recognition system 110, for example, using a mouse or a keyboard. It will be understood that the ROI may be of any symmetrical or asymmetrical shape and size. In one embodiment, the logo recognition system 110 may capture only the ROI of each of the specimen video while recording the specimen video.

On identification of the ROIs, the logo recognition system 110 quantizes the colours of the pixels in the ROIs of all the frames of the specimen video and stores them. It will be understood that the quantization of the colours of the pixels includes quantization of values of the colours of the pixels.

Once the pixels in the ROI in all the frames of the specimen video have been quantized, the identification module 114 identifies static and non-static pixels, from among these pixels of the specimen video. In one implementation, to identify the static and the non-static pixels, identification module 114 may employ stochastic measuring techniques. For example, identification module 114 may compute dispersion of a quantized value of colour of each pixel in one frame of the specimen video corresponding to the same pixels in the rest of the frames of that specimen video. In said example, the dispersion of the quantized value of colours is compared with a threshold value to identify the static and the non-static pixels. The static pixels are marked as pixels-of-interest (POI) as they are generally a part of the logo and are pertinent for logo recognition, whereas the non-static pixels are marked as "white" indicating that they are not pertinent for logo recognition because they are generally a part of the dynamic video.

In one implementation, each pixel in the ROI of the specimen video, for example, in a first frame of the ROI, is evaluated in the manner as described above to identify the POIs and "the white" pixels in the specimen video. Further, in one implementation, the identification module 114 stores the pixels in the ROI marked as POIs and "white", and the quantized values of the POIs in a template for the specimen video. Further, the identification module 114 stores the ROI of the specimen video as the template ROI along with the template and associates it with the template. In one example, the template ROI includes coordinates of the boundary delineating the ROI. In another example, when the ROI is a circular region, the template ROI may include the coordinates of the centre of the circle and the radius of the circle. Further, each template may be annotated by the administrator and associated with a logo ID in a repository in the logo recognition system 110. In one implementation, the logo ID may be further associated with a channel in the channel file corresponding to the template. In said embodiment, the identification module 114 processes all the specimen videos corresponding to the various channels to obtain corresponding templates for each channel in the channel file.

Further, in one example, the commencement of logo recognition is done by the logo recognition system 110 when the user device 112 connected to the logo recognition system 110 is switched on. As the user device 112 is switched on, a feed video relayed on a channel selected by the user is displayed on a screen of the user device 112. The user selects the channel from among a variety of channels transmitted by the broadcasting stations. The logo recognition system 110 records a plurality of frames of the feed video displayed on the screen of the user device 112. The frames of the feed video are hereinafter referred to as feed frames.

Once the feed frames have been recorded, in one implementation, the logo recognition system 110 compares and matches one feed frame to each of the templates in the template database. In said implementation, the identification module 114 compares and matches the templates with the feed frame. In said implementation, when comparing the feed frame with a template, the identification module 114 identifies a region-of-interest (ROI) in the feed frame based on information associated with the template. In one example, the identification module 114 identifies the ROI in the feed frame based on the template ROI stored and associated with the template, thereby achieving a one-to-one mapping of the pixels in the two ROIs.

Further, the identification module 114 identifies the POIs in the ROI of the feed video to be compared with the template. In said embodiment, the identification module 114 identifies the POIs in the feed frames based on the information in the template. In one example, the identification module 114 extracts the POIs stored in the template and identifies and marks the same POIs in the feed frame.

Subsequent to the marking of the POIs in the feed frame, the colours of the POIs in the feed frame are quantized. In one implementation, the colours of the POIs are quantized in the same manner as described earlier with reference to the quantization of colours of pixels in the specimen video. In said implementation, the quantized values of colours of the POIs of the feed frame are stored and may be used to recognize the logo in the feed video as will be explained later.

Upon quantization of the POIs, the recognition module 116 matches and compares the feed frame to the template. In an implementation, the recognition module 116 compares the POIs marked in the feed frame to the corresponding POIs in the template to match the feed frame with the template. In said implementation, the recognition module 116 compares and matches the POIs based on their quantized colours. In said implementation, the recognition module 116 computes, based on the comparison of the POIs, a correlation coefficient for the template, which is a measure of, for example, the number of matching POIs for the feed frame and the template. The recognition module 116 then computes the correlation coefficient for each of the templates in the template database in the same way as described. Further, the recognition module 116 marks all the templates, for which the correlation coefficient is above a threshold match value, as candidate match template.

Subsequently, each of the candidate match templates is then compared and matched to a predetermined number of other feed frames in the same manner as described above. Further, for the comparison of a candidate match template with the feed frames, the recognition module 116 computes a logo score. Based on the candidate match template with the maximum logo score, the recognition module 116 determines the logo ID from the channel file. In an implementation, a match channel corresponding to the logo ID is further determined by the recognition module 116, for example, from the channel file.

Figure 2:
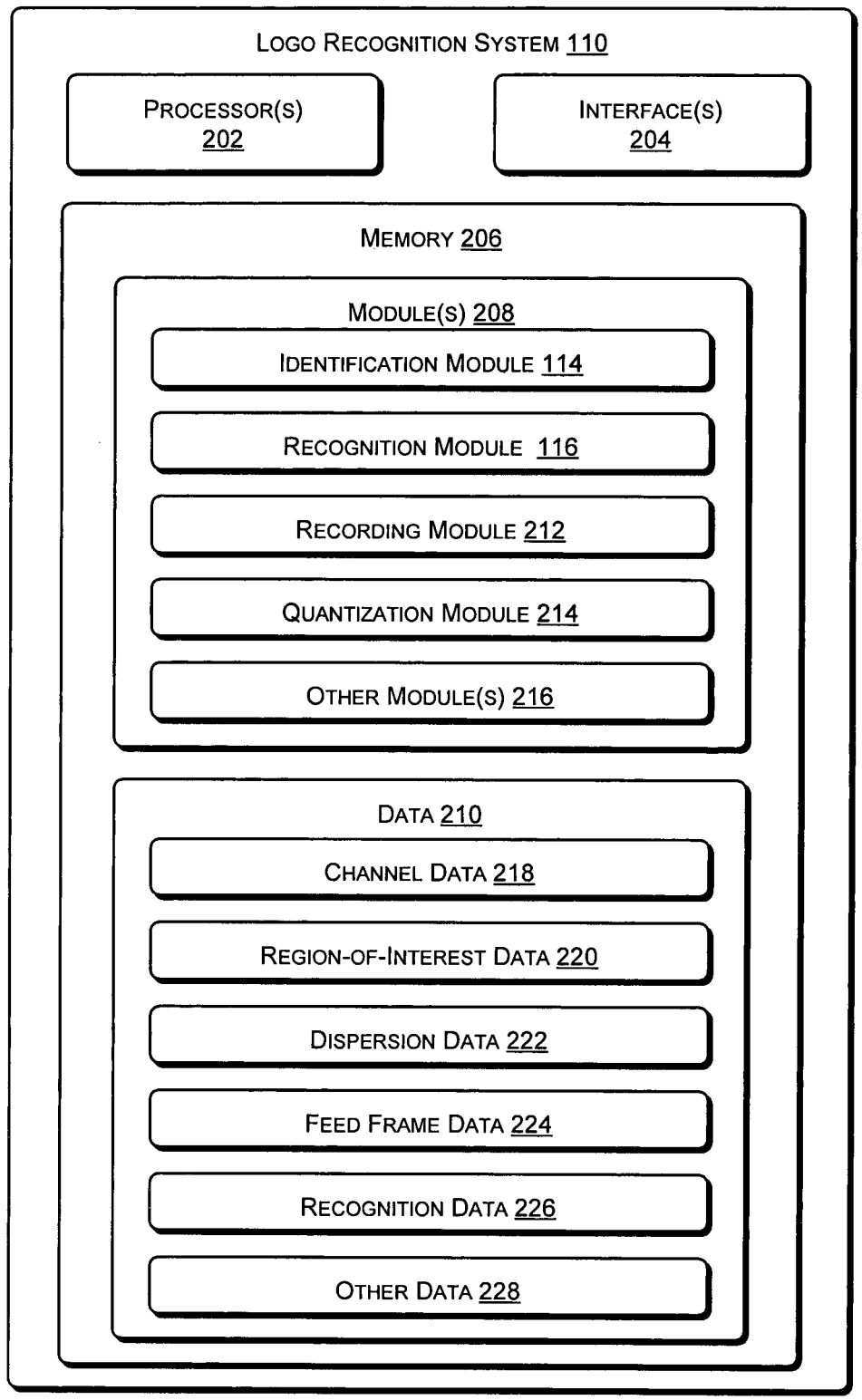
FIG. 2 illustrates an exemplary logo recognition system, in accordance with an implementation of the present subject matter.

FIG. 2 illustrates exemplary components of the logo recognition system 110, according to an embodiment of the present subject matter. In said embodiment, the logo recognition system 110 includes one or more processor(s) 202, The Input and Output (I/O) interface(s) 204, and a memory 206 coupled to the processor 202.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 206.

The I/O interfaces 204 may include a variety of software and hardware interfaces, for example, interface for peripheral device(s), such as a keyboard, a mouse, an external memory, a printer, etc. The I/O interfaces 204 may facilitate multiple communications within a wide variety of protocols and networks, such as the network 108, including wired networks, e.g., cable, LAN, etc., and wireless networks, e.g., satellite, WLAN, etc. The I/O interfaces 204 may include one or more ports for connecting the logo recognition system 110 to another device, such as the user device 112. Further, the I/O interfaces 204 may enable the logo recognition system 110 to communicate with other computing devices, such as web servers and external databases.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 also includes module(s) 208 and data 210.

The modules 208, amongst other things, include routines, programs, objects, components, data structures, etc., which perform particular tasks or implement particular abstract data types. The modules 208 further include, for example, the identification module 114, the recognition module 116, a recording module 212, a quantization module 214, and other module(s) 216. The other modules 216 may include programs or coded instructions that supplement applications and functions on the logo recognition system 110, for example, programs in the operating system.

On the other hand, the data 210 serves, amongst other things, as a repository for storing data processed, received, and generated by one or more of the module(s) 208. The data 210 includes, for example, channel data 218, region-of-interest (ROI) data 220, dispersion data 222, feed frame data 224, recognition data 226, and other data 228. The other data 228 includes data generated as a result of the execution of one or more modules in the other module(s) 216.

In operation, the recognition module 116 recognizes the logo of the channel on which the feed video is transmitted. As mentioned before, the feed video is usually transmitted on a channel by a television network provider over the network 108. In one implementation, the recognition module 116 creates a channel file having a list of the channels provided to the user device 112. In one example, the channel file includes the channel IDs and the URLs of the websites of the channels. In another implementation, the channel file is provided and stored by an administrator operating the logo recognition device 110. In an embodiment, the channel file is stored in the channel data 218.

For logo recognition, the logo recognition system 110 creates and populates a template database stored in the channel data 218. It will be understood that the template database may be implemented external to the logo recognition system 110. For the creation of the template database, the recording module 212 captures and records specimen videos of all the channels transmitted, for example, by the network service provider, to the user device 112. A single specimen video displayed on the user device 112 may correspond to one channel and may be considered as a plurality of frames being displayed one after the other. Thus, for recording the specimen videos, the recording module 212 captures the plurality of frames of the specimen videos and stores them in the channel data 218. In one example, about 1800 frames for each specimen video are recorded by recording each specimen video for about 10 to 15 minutes to avoid errors during logo recognition.

Once the frames are recorded, the identification module 114, as mentioned earlier, may be configured to identify one or more ROIs for each specimen video. The ROIs are those regions of a frame where the logos in a channel are usually positioned, for example, at the four corners of the frame. In an implementation, the identification module 114 identifies the ROI by comparing all the pixels of one frame of the specimen video to all the pixels of the subsequent frames and determining the static pixels of the frames. In another embodiment, a region of interest (ROI) is demarcated and annotated manually by an administrator for each specimen video using peripheral devices, such as a mouse or a keyboard. Further, the information regarding the ROI of the specimen video, referred to as the template ROI, is stored in the ROI data 220. In one example, the ROI data 220 includes the coordinates of the boundary demarcating the ROI of the specimen video.

Once the ROI in the specimen video is marked, the quantization module 214 achieves a quantization of the colours of each pixel in the frames of the specimen video. For the purpose of explanation, the colours of the pixels may be understood as the values of the colours of the pixels. The colours of the specimen video displayed on the user device 112 are usually represented in UYVY colour scheme. In such schemes, if the display uses three 256-bit colours, then the total number of colour values is about $256^3$. In one implementation, the quantization module 214 achieves the quantization of the values of the colours and represents the colour of each pixel in Hue-Saturation-Value (HSV). In one example, the colours of all the pixels in the ROI of the specimen video are represented by 36 (0 to 35) sets of values when the colours are represented in the quantized HSV scheme using, for example, a quantized binary index.

Further, the identification module 114 determines the static and the non-static pixels across the frames of the specimen video. The identification module 114 identifies the static and the non-static pixels to identify the pixels that are pertinent for logo recognition. For example, an almost static pixel across the frames of a specimen video indicates that the pixel is a part of a static logo of the channel. On the other hand, a dynamic pixel across the frames of the channel indicates that the pixel is a part of the specimen video being displayed.

For the purpose of identifying the static and the dynamic pixels in the specimen video, in one implementation, the identification module 114 computes a dispersion of the colour of each pixel from one frame of a specimen video to the same pixel in the rest of the frames of the specimen video. The dispersion of colours of the pixels may be computed by computing the standard deviation or variance of the colours of the pixels. Further, the identification module 114 may store the values of dispersion for the pixels in the dispersion data 222.

In addition, the identification module 114 compares the dispersion computed for each pixel across the frames of a specimen video to a predetermined threshold value of the dispersion to identify the static and the dynamic pixels. The threshold value of the dispersion may be stored in the other data 228. For example, if the value of dispersion is below the threshold value, it indicates that the pixel is an almost static pixel is therefore a part of the logo. The identification module 114 marks such a pixel as pixel-of-interest (POI). Conversely, if the value of the dispersion is above the threshold value, it indicates that the pixel is dynamic and is part of the video. Such pixels are marked as "white" by the identification module 114 and are not considered pertinent for logo recognition.

Further, the POIs along with their quantized colour values, and the "white" pixels marked, are saved in the template database. These stored "white" pixels and the POIs and the quantized colour values of the POIs are referred to as the templates. In one implementation, one template is saved for one specimen video, i.e., for one channel. As mentioned earlier, each of the templates is associated with a logo ID and stored in the template database in the channel data 218. The logo ID may be further associated with a channel ID in the channel file in the channel data 218.

In addition, along with the above, the information pertaining to the ROI of the specimen video, referred to as template ROI, is also extracted and stored, for example, in the ROI data. In one example, when the template ROI has a rectangular area then the ROI data 220 includes the coordinates of one of the corners of the rectangle and the width and height of the rectangle. In another example, when the template ROI is a circular region then the ROI data 220 includes the coordinates of the centre of the circle and the radius of the circle. Further, the ROI data 220 is associated with the channel data 218 to associate the information pertaining to the template ROI with information stored in the template. The logo recognition system 110 processes all the specimen videos in the manner described above to create and populate the template database in the channel data 218. Further, the template ROI for each specimen video is also stored in the ROI data 220 and associated with the corresponding template in the channel data 218. With the templates for each specimen video stored in the channel data 218 and associated with the corresponding ROI template in the ROI data 220, the creation of the template database in the channel data 218 is created.

During operation of the logo recognition system 110, the recognition module 116 commences logo recognition for a logo of a channel when the feed video is relayed on the channel and is displayed on the user device 112, for example, when a user of the user device 112 switches the user device 112 on for viewing the feed video. In another example, the recognition module 116 may commence logo recognition when prompted by an administrator operating the logo recognition system 110.

Similar to the specimen video, the feed video displayed on the user device 112 is in the form of a plurality of frames being subsequently displayed. The recording module 212 captures and records a plurality of frames of the feed video and stores them in the feed frame data 224.

The logo recognition system 110 recognizes the logo in the feed video by comparing and matching the feed frames to the templates in the template database. In one implementation, the recognition module 116 compares one feed frame from the plurality of the feed frames to the each of the templates. For comparing the feed frame to a template, the identification module 114 first identifies the region-of-interest (ROI) in the feed frame. In one implementation, the identification module 114 identifies the ROI of the feed frame based on the ROI data 220 associated with the template in the channel data 218. In one example, the identification module 114 identifies the ROI of the feed frame based on the template ROI in the ROI data.

Once the ROI of the feed frame has been identified, the identification module 114 identifies the POIs in the feed frame. In one implementation, the POIs of the feed frame are identifies based on the POIs of the template stored in the channel data 218. Hence, in said implementation, similar to the POIs of the template being present in the template ROI, the POIs of the feed frame are identified in the ROI of the feed frame.

On the identification of the POIs in the feed frame, the quantization module 214 quantizes the colours of the POIs. In one implementation, the quantization module 214 quantizes the colours of the POIs which are initially represented in UYVY colour format and represents the colours of the POIs in HSV colour scheme, as explained earlier. Hence, in said implementation, the colours, for example, red, blue, and green colour, of the POIs are represented in 37 sets of values instead of the 256 values of each of the colours. The colours of the POIs of the feed frame are stored in the recognition data and used in logo recognition by the recognition module 116 as will be explained later.

Subsequently, in one implementation, the recognition module 116 compares and matches the feed frame to the template. In said implementation, the recognition module 116 compares and matches the POIs of the feed frame to the POIs in the template, for example, based on the quantized colours of the pixels. On the comparison of the feed frame and the template, the recognition module 116 computes the correlation coefficient for that template. In one example, the correlation coefficient is indicative of the number of similar POIs in the feed frame and in the template. The correlation coefficient computed for the template may be stored in the recognition data 226.

As mentioned earlier, in one implementation, if the correlation coefficient computed for the template is greater than the threshold match value, then the recognition module 116 marks the template as the candidate match template. Once the correlation coefficient is computed for a template, the recognition module 116 compares and matches the feed frame to a subsequent template in the template database.

For matching the feed frame with the subsequent template, the recognition module 116 processes the feed frame in the same way as when it was compared with the previous template. The recognition module 116 identifies the ROI and the POIs in the feed frame based on the information in the subsequent template and then the computes the correlation coefficient for the subsequent template.

The recognition module 116, in the same manner as described above, compares and matches all the templates in the template database to the feed frame and computes a correlation coefficient for each of the templates. Further, the recognition module 116 marks all the templates, for which the correlation coefficient is greater than the threshold match value, are marked as the candidate match templates.

Further, in one implementation, the recognition module 116 compares all the candidate templates to a predetermined number of feed frames, for example, 8 feed frames other than the previously compared feed frame, in the feed frame data 224. In one example, the predetermined number of the feed frames to be compared with the candidate match templates is randomly selected. For each candidate match template compared with the predetermined number of feed frames, the recognition module 116 computes a logo score for each of the candidate match template.

In one example, the logo score is indicative of the number of feed frames from the predetermined number of feed frames that match with the candidate frame. Further, based on the candidate match template having the maximum logo score, the recognition module 116 determines the logo ID, for example, from the channel data 218. In an implementation, the recognition module 116 may also identify the match channel to which the logo belongs, for example, based on the channel ID associated with the logo ID in the channel data 218.

In an implementation, after the candidate templates are obtained, the recognition module 116 may determine whether the candidate templates correspond to a single channel or not. If the candidate templates correspond to a single channel, then that channel is determined as the match channel. If the candidate match frames correspond to more than one channel then the match channel is determines in the manner described above.

If, on the other hand, the value of the correlation parameter for all of the templates does not exceed the threshold match value, then the recognition module 116 deduces that the channel relevant to the feed video is either a new channel or an old channel with a new logo. In such a case, the recognition module 116 prompts the logo recognition system 100 to create a template for the feed video, for example, based on the POIs marked in the frames of the feed video, and stores the template in the template database and associate the information pertaining to the template ROI with the template in the template database.

According to an aspect of the present subject matter, once the match channel is identified, the logo recognition system 110 may use the information in the channel data 218 for various purposes. In one example, based on the channel data 218, which may include the URLs of the website of the channel, the logo recognition system 110 may obtain an electronic programme guide (EPG) relevant to the channel from a website of the channel.

In another example, the recording module 212 may be configured to record the video from a channel based on the inputs, such as time duration, provided by the user of the user device 112. The recording module 212 may use the logo recognition to determine whether the relayed channel is showing a programme or is the programme interrupted by an advertisement. In said example, the recording module 212 determines that the channel is showing an advertisement by determining an absence of the logo based on logo recognition achieved by the logo recognition system 110. Further, the recording module 212 may be configured to suspend the recording of the video for the duration when the logo is absent from the video.

Further, in one implementation, when the logo recognition system 110 identifies a change of channel at the user device 112, for example, by the interruption of a first feed video relayed on one channel by a blue or a black screen for a predetermined small interval of time before a second feed video is transmitted on another channel, the logo recognition is commenced for the second feed video.

Figure 3:
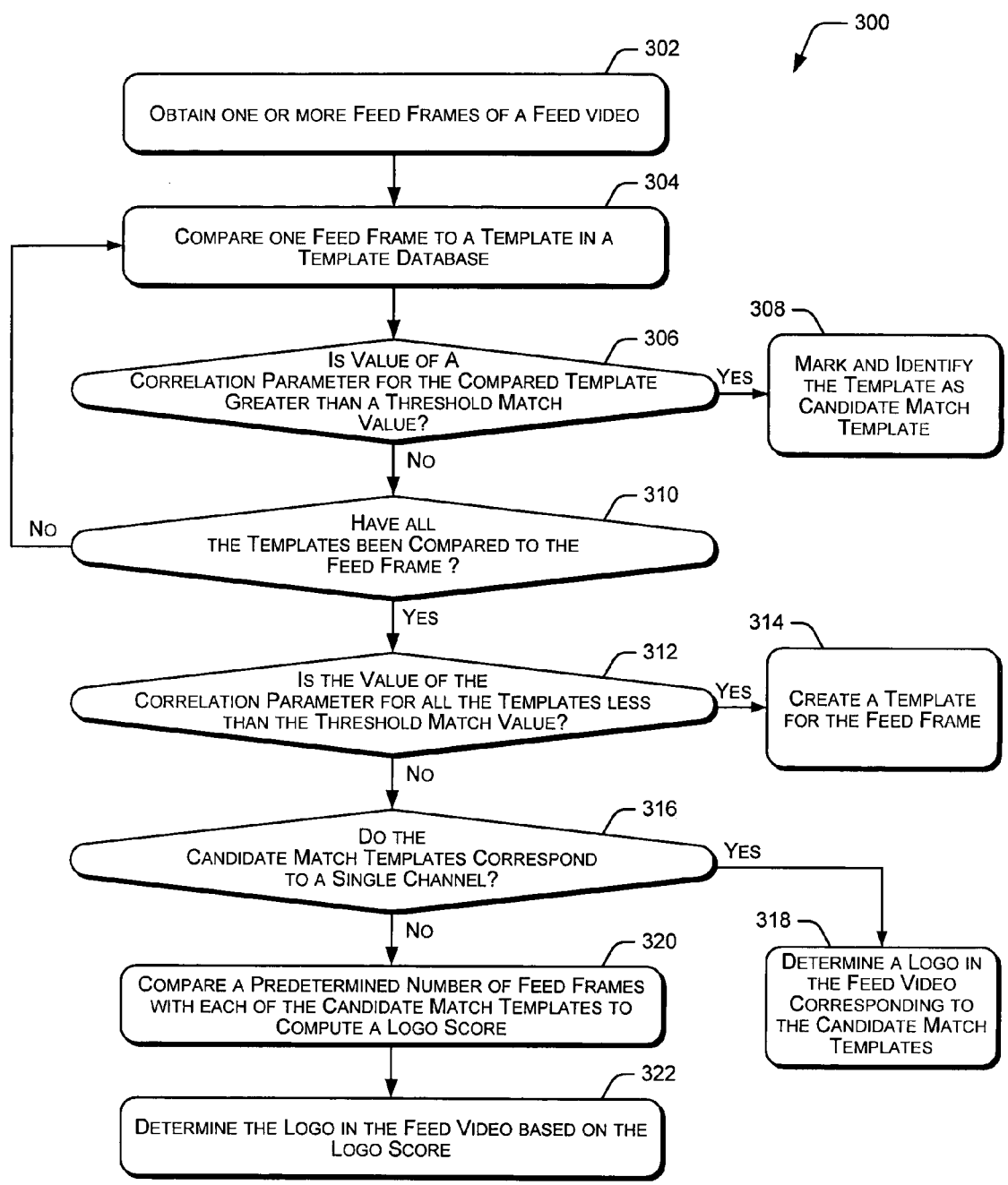
FIG. 3 illustrates an exemplary method for recognizing a logo, in accordance with an implementation of the present subject matter.
Figure 4:
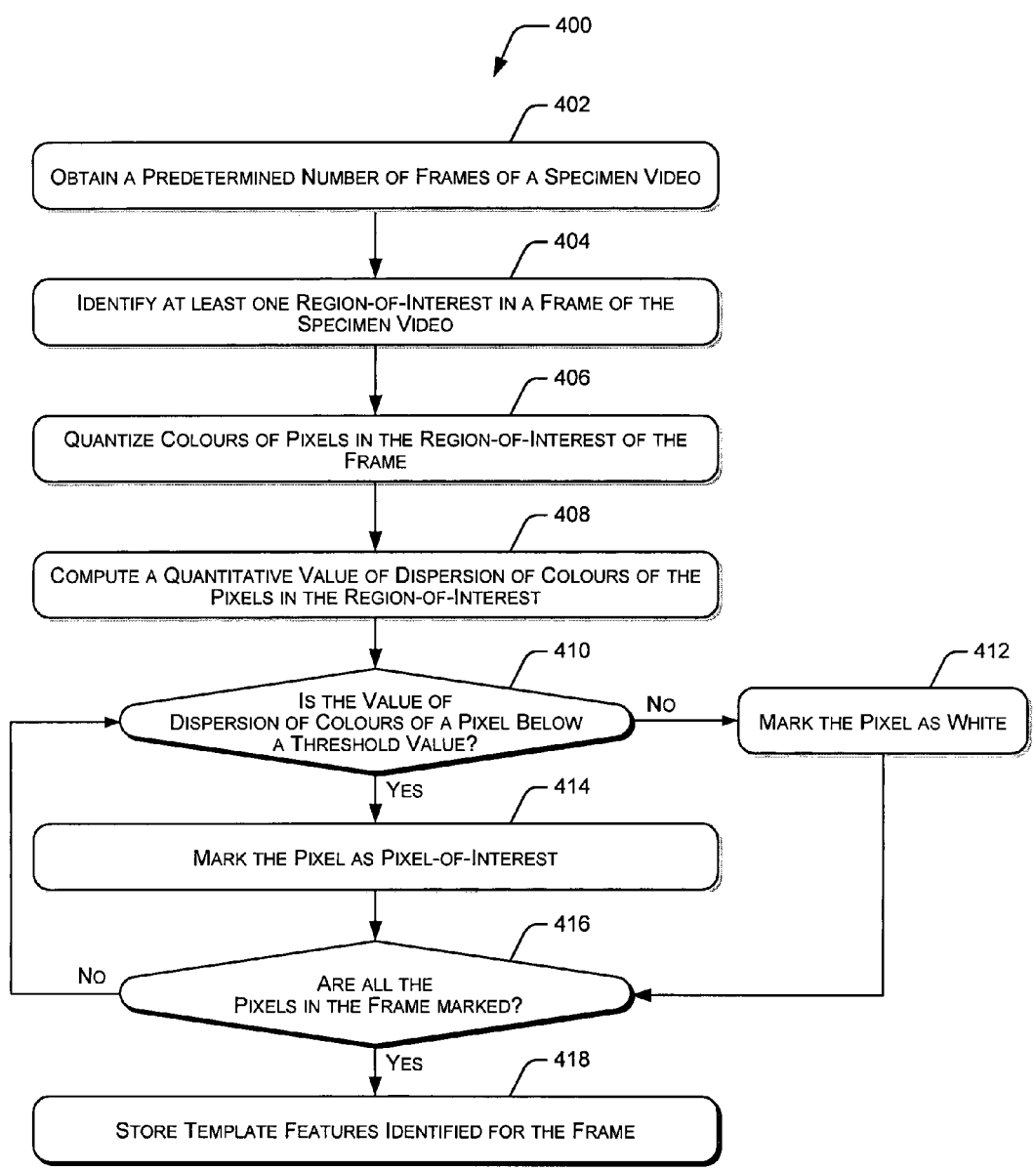
FIG. 4 illustrates an exemplary method for creating a template database for logo recognition, in accordance with an implementation of the present subject matter.

FIG. 3 and FIG. 4 illustrate a method of logo recognition, according to an embodiment of the present subject matter. In an embodiment, the method of logo recognition is achieved by a logo recognition system, such as the logo recognition system 110. It will be understood that although the method described herein is in context of the logo recognition system 110, other systems having similar functionalities may also be used.

The exemplary methods may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the methods are described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof.

FIG. 3 describes an exemplary method 300 for logo recognition, according to an embodiment of the present subject matter. Referring to FIG. 3, at block 302, a plurality of frames of a feed video, referred to as feed frames hereinafter, are obtained. In an example, the recording module 212, in the logo recognition system 110, records the feed video for a predefined period of time say 10 to 15 minutes. As mentioned earlier, in one example, the recording module 212 starts recording when the feed video, transmitted on a channel, is displayed on a user device, such as the user device 112. The feed video is usually relayed on a channel by a broadcasting station and received at the user device 112 in the form of a plurality of frames. After the feed frames are obtained, one of the feed frames is selected from the plurality of feed frames by, for example, the recognition module 116, and is further used for recognizing the logo.

At block 304, the feed frame is compared with a template in a template database. In an implementation, the template is randomly selected by, for example, the recognition module 116, and obtained for comparison. In one example, the template is previously stored in the template database the channel data 218 by processing a specimen video relayed on a various channel, and transmitted and displayed on the user device 112. Hence, the template corresponds to one channel transmitted by the broadcasting station. The method of processing the specimen videos for the creation of the template database will be understood in detail with reference to FIG. 4.

Further, to achieve the comparison of the feed frame and the template, a region-of-interest (ROI) and one or more pixels-of-interest (POIs) are identified in the feed frame. For example, the ROI and the POIs are identified by the identification module 114. In said example, the identification module 114 identifies the ROI in the feed frame based on the ROI data 220, associated with the template in the channel data 218. The ROI data may include the information pertaining to a template ROI based on which an exactly similar ROI is identified in the feed frame. Further, the POIs in the ROI of the feed frame are identified based on information stored in the channel data 218, for example, the information pertaining to the POIs of the template stored during the creation of the template database. In said example, the POIs of the template and the POIs of the feed frame are mapped to each other according to one-to-one mapping.

Further, after the POIs in the feed frame have been identified, a quantization of the colours of the POIs is achieved. In an implementation, the colours of the POIs, which are initially represented in the UYVY colour scheme, are quantized and represented in the HSV (hue-saturation-value) colour scheme. In an example, the quantization of the colours of the POIs of the feed frame is achieved by the quantization module 214.

Subsequent to the quantization of the colours of the POIs of the feed frame, the feed frame is compared with the template. In one implementation, the POIs of the feed frame are compared with the POIs of the template based on the quantized colours of the POIs of the feed frame and the template. Further, based on the matching of the feed frame and the template, a correlation coefficient is computed for the template. In one implementation, the comparison of the feed frame and the template, and the subsequent computation of the correlation coefficient are achieved by a recognition module, such as the recognition module 116.

At block 306, a determination is made to ascertain whether the value of the coefficient parameter is greater than a threshold match value. In one implementation, the threshold match value is predetermined, for example, based on several use case scenarios. In one example, the threshold match value is about 0.75 indicating that about 75% of the POIs of the template are similar to the POIs of the feed frame.

If the value of the coefficient parameter is greater than the threshold match value ("Yes" branch from block 306), then the template is marked as the candidate match template at block 308, for example, by the recognition module 116. On the other hand, if the value of the coefficient parameter is less than the threshold match value ("No" branch from block 306), then it is determined whether there are any other templates in the template database and whether the rest of the templates have been compared with the feed frame, as shown in block 310.

At block 310, it is ascertained whether all the templates in the template database have been compared with the feed frame or not. In one embodiment, the ascertaining of whether all the templates have been compared with the feed frame is achieved by the recognition module 116 based on a channel file in a channel data, such as the channel data 218. In case it is ascertained that all the templates have not been compared ("No" branch from block 310), then the remaining templates are compared with the feed frame, for example, by the recognition module 116 at block 304 in the same manner as described. Further, the correlation parameters are computed for each of the templates and the correlation parameters are compared against the threshold match value as explained at block 306 to identify and mark the candidate match templates at block 308.

If, on the other hand, it is ascertained that all the templates in the template database have been compared with the feed frame ("Yes" branch from block 310) then it is further ascertained at block 312 whether there are any candidate match templates or not.

At block 312, it is determined whether the value of the correlation parameter for each of the templates, compared with the feed frame, is less than the threshold match value or nor. In one implementation, the determination at block 312 is achieved by the recognition module 116. The determination at block 312 is achieved to ascertain whether the template for the feed video corresponding to the feed frame is present in the template database or not.

If the determination made at block 312 ascertains that the value of correlation parameter for all the templates in the template database is less than the threshold match value ("Yes" branch from block 312) then it is indicative that either the channel on which the feed frame is relayed is not present in the channel data 218 or the logo corresponding to the feed frame is not present in the template database, i.e., either the channel is new or the logo is new.

Subsequently, at block 314, a template is created based on the feed frame and stored in the template database. Further, in one embodiment, an administrator operating the logo recognition system 110 associates the template created for query feed frame with the corresponding logo ID and the channel ID and are stored in the channel data 218, for example, in the channel file in the channel data 218.

Conversely, if the determination made at block 312 yields that the value of the correlation parameter for all the templates is not less than the threshold match value ("No" branch from block 312), then it is indicative that there are one or more candidate match templates and the method transitions to block 316.

After it is determined at block 312 that there are one or more candidate match frames, at block 316 it is determined whether the candidate match templates correspond to a single channel or not. In one implementation, such a determination is made using the recognition module 116 based on the channel data 218, for example, based on the channel list in the channel data 218. If it is determined at block 316 that the candidate match templates correspond to a single channel in the channel list ("Yes" branch from block 316), then method transitions to block 318.

However, if it is determined that the candidate match templates do not correspond to a single channel in the channel list ("No" branch from block 316), then the candidate match templates are further processed at block 320.

At block 318, the channel to which the candidate match templates correspond is determined based on the channel data 218 and selected as a match channel, when the candidate match frames correspond to a single channel at block 316. Based on a channel ID of the match channel, the logo is identified from the channel data 218 from the logo ID associated with the cannel ID of the match channel. In case only one candidate match template is obtained after comparing the templates with the feed frame, then the channel corresponding to that candidate match template is selected as the match channel and the logo for the match channel is identified as described above.

Further, when the candidate match templates do not correspond to a single channel at block 316, then at block 320, the candidate match template are compared with a predetermined number of the feed frames. In one example, the candidate match templates are compared with 8 feed frames, which are randomly selected out of the plurality of feed frames obtained at block 302. Hence, in said example, the total number of frames compared with each of the candidate templates is 9.

In one implementation, the comparison of the candidate match templates with the feed frames is achieved in the same manner as described at block 304. Based on the comparison of the candidate match templates to each of the feed frames, a logo score is computed for each candidate match template. The logo score of a candidate match template, in one example, is indicative of the number of feed frames, out of the 9 feed frames, for which the correlation coefficient is greater than the threshold match value.

Further, at block 322, the logo in the feed video is determined based on the candidate match template having the maximum logo score. In one example, the logo is determined based on the candidate match template with the highest cumulative logo score. In another example, the logo scores of each candidate match template are averaged and the logo is determined based on the candidate match template with the highest average logo score. In one implementation, the logo ID associated with the candidate match template having the maximum logo score is determined to recognize the logo based on the channel data 218. Further, once the logo is recognized, the logo ID may be further used to identify the match channel associated with that logo ID in the channel data 218. For example, the channel ID associated with the logo ID in the channel file is used to determine the match channel.

In one implementation, after the channel is identified as the match channel, an electronic programme guide (EPG) relevant to the channel may be obtained based on the channel ID of the match channel. In an example, based on the channel list in the channel data 218, which may include the URLs of the channels in the list of the channels, the EPG for the channel ID may be obtained by connecting to the channel's website through a network, such as the internet.

In another example, the logo recognition may be used to regulate a recording of a video transmitted on a channel. A recording module, such as the recording module 212, in the logo recognition system 110 may be configured to record the video from a channel based on the inputs, such as time duration, provided by the user of the user device 112.

The method of logo recognition in accordance with the present subject matter may be used to determine whether the relayed channel is showing a programme or is the programme interrupted by an advertisement. In said example, the determination of whether the channel is showing an advertisement or not is achieved by determining an absence of the logo based on logo recognition in accordance with present subject matter. Further, the recording of the video may be suspended for the duration when the logo is absent from the video.

FIG. 4 illustrates an exemplary method 400 for creating the template database for logo recognition, according to an embodiment of the present subject matter. For the creation of the template database, the specimen videos from the various channels in the channel list are recorded. Further, these specimen videos are processed to obtain one or more templates for each specimen video. Each template obtained from processing a specimen video corresponds to the channel relaying that specimen video.

At block 402, a plurality of frames of the specimen video, being relayed on a channel, is obtained. The plurality of frames of the specimen video is obtained, for example, by recording the specimen video for a predefined period of time say 10 to 15 minutes. In one embodiment, the plurality of frames of the template video is obtained by the recording module 212.

At block 404, one or more regions-of-interest (ROIs) are identified in the plurality of frames. In one embodiment, the ROIs are identified by an identification module, such as the identification module 114. In an implementation, the identification module 114 identifies the ROI by comparing all the pixels of one frame of the specimen video to all the pixels of the subsequent frames and determining the static pixels of the frames. In another embodiment, a region of interest (ROI) is demarcated and annotated manually by an administrator for each specimen video using peripheral devices, such as a mouse or a keyboard. Further, the information regarding the ROI of the specimen video, referred to as the template ROI, is stored in an ROI data, such as the ROI data 220. In one example, the ROI data 220 includes the coordinates of the boundary demarcating the ROI of the specimen video.

Further, at block 406, the colours of the pixels in the ROIs of the frames are quantized. The quantization of the colours of pixels can be understood as the quantization of the value of colours of the pixels. The colours of the pixels of the template video are usually represented in a complex colour scheme, such as the UYVY colour scheme. In one embodiment, a quantization module, such as the quantization module 214, quantizes the colours of the pixels and represents them in simple colour schemes. For example, the colours of the pixels are quantized and represented in HSV (hue-saturation-value) scheme. In said example, $256^3$ values of the colours, such as red, blue, green colours, are quantized to be represented in 36 sets of values of these colours.

Once, the colours of the pixels are quantized at block 406, a quantitative value of dispersion is computed for each pixel across the frames at block 408. For example, the dispersion is computed by computing standard deviation and/or variance of the colours for the same pixel across the frames of the feed video. Further, in said example, the dispersion of colours across the frames is computed for all the pixels in the ROIs. In one example, the computation at block 406 is achieved by the identification module 114 and stored in the dispersion data 222.

Further at block 410, a determination is made to ascertain whether the value of dispersion of the colours of a pixel is below a threshold value or not. Such a determination at block 410 helps in identifying whether the pixel is static or non-static. As explained before, a static pixel is usually a part of the logo of the channel and is relevant to logo recognition, whereas a dynamic pixel is usually a part of the relayed video of the channel or a part of the transparent background of the logo, and may not be relevant for logo recognition. In an embodiment, the determination at block 410 is achieved by the identification module 114 based on a threshold value. In one example, the threshold value of the dispersion may be predetermined based on use cases.

If the determination made at block 410 ascertains that the value of dispersion of the colours of the pixel is not below a threshold value ("No" branch from block 410), then the pixel is marked as "white" at block 412 to indicate that the pixel is non-static and not relevant for logo recognition.

On the other hand, if the determination ascertains that the value of dispersion of the colours of the pixel is below a threshold value ("Yes" branch from block 412), then the pixel is marked as a pixel-of-interest (POI) at block 414 to indicate that the pixel is static and is, therefore, relevant for logo recognition.

It will be understood that other stochastic measuring techniques, in place of dispersion, can be used to identify whether the pixel is static or non-static.

Further, at block 416, it is ascertained whether all the pixels have been marked as POIs or "white" based on the value of dispersion across the various frames. If not, then the remaining pixels of the specimen video are processed in the manner as explained in block 410, and block 412, and block 414.

If all the pixels have been marked ("Yes" branch from block 416), then one or more template features identified for the frame are stored at block 418. In one implementation, the template features include, the quantized colours of the POIs, and the references, for example, positioning, of the POIs and the white pixels. These template features are saved as the template for the specimen video. In said implementation, the template is stored in the template database in the channel data 218. Further, the template is associated with the ROI data 220, for example, the template ROI in the ROI data 220. As explained earlier, the template corresponding to a channel is also associated with a logo ID of the channel, for example, in the channel file, for logo recognition. The logo ID may, in turn, be associated with the channel ID to identify the channel once the logo is recognized.

The method 400 is repeated for all the specimen videos recorded by the recording module 212 for the various channels and one or more templates are obtained for each of the specimen video. All the templates are then stored in the template database and used by the logo recognition system 110 for logo recognition as explained with reference to FIG. 3.

It will be understood that although the above description is provided with reference to the recognition of static logos, the same concepts can be extended for the recognition of other type of logos, for example, alpha blended logos, static logos with dynamic colours, and animated logos having deterministic pattern of animation.

Although embodiments for logo recognition have been described in language specific to structural features and/or methods, it is to be understood that the present subject matter is not necessarily limited to the specific features or methods described. Rather, the specific features and methods are disclosed as exemplary embodiments of logo recognition. Further, although the systems and methods are described herein with reference to channel identification by logo recognition, it will be understood that the concepts of logo recognition can be extended to other applications, without departing from the spirit and scope of the present subject matter.

We claim:

1. A computerized method for recognizing a logo, the method comprising:
    obtaining a plurality of feed frames from a display, wherein each feed frame from the plurality of feed frames has the logo embedded therein;
    comparing at least one region-of-interest (ROI) in a feed frame from the plurality of feed frames to each template from a plurality of templates;
    computing a correlation parameter for each template based on the comparing;
    identifying one or more candidate match template based on the correlation parameter;
    determining a logo score based on comparison of each of the one or more candidate match templates against a predetermined number of feed frames from the plurality of feed frames; and
    recognizing the logo based on the logo score.

2. The method as claimed in claim 1, wherein the comparing comprises:
    obtaining a template from amongst the plurality of templates for comparison with the feed frame;
    determining the region-of-interest (ROI) in the feed frame based on the template;
    identifying at least one pixel-of-interest (POI) in the ROI based on a template ROI of the template;
    quantizing colours of the POI in the ROI; and
    comparing the POI in the ROI of the feed frame with the template based on the quantized colours of the POI.

3. The method as claimed in claim 1, further comprising:
    processing at least one specimen video corresponding to each of a plurality of channels; and
    obtaining the plurality of templates based on the processing, wherein each of the plurality of channels is associated with at least one of the plurality of templates.

4. The method as claimed in claim 1, wherein the recognizing is further based on the matching of the candidate match templates against the predetermined number of feed frames.

5. The method as claimed in claim 1 further comprising creating a template based on the feed frame if the correlation parameter for each of the plurality of templates is below a threshold match value.

6. The method as claimed in claim 1, wherein the logo is a static logo.

7. The method as claimed in claim 1 further comprising identifying a channel, based on the logo, relaying the feed video.

8. The method as claimed in claim 1, wherein the obtaining comprises:
 obtaining a plurality of frames of a specimen video;
 identifying at least one region-of-interest (ROI) in each of the plurality of frames;
 quantizing colours of pixels in the at least one ROI of each of the plurality of frames;
 identifying static pixels across the plurality of frames, wherein the static pixels are relevant for logo recognition; and
 annotating each of the plurality of frames as feed frames for creation of a template database.

9. The method as claimed in claim 8, wherein the identifying the static pixels comprises:
 computing dispersion of colours for each of the pixels across the plurality of frames; and
 matching the dispersion of colours of each of the pixels with a threshold value of dispersion to identify the static pixels.

10. A logo recognition system comprising:
 a processor; and
 an identification module coupled to and implemented by the processor, the identification module configured to process a plurality of feed frames, having a logo embedded therein, to identify at least one pixel-of-interest (POI) in at least one of the plurality of feed frames, wherein the POI is a static pixel; and
 a recognition module coupled to and implemented by the processor, the recognition module configured to,
  compare the POI in the at least one of the plurality of feed frames with each of a plurality of templates to compute a correlation parameter;
  identify one or more candidate match templates from the plurality of templates based on the comparison;
  determine a logo score based on a comparison of each of the one or more candidate match templates against a predetermined number of feed frames from the plurality of feed frames; and
  recognize the logo based on the logo score.

11. The logo recognition system as claimed in claim 10, wherein the identification module is further configured to identify the POI in the at least one of the plurality of feed frames based on a template obtained from the plurality of templates compared with the feed frame.

12. The logo recognition system as claimed in claim 10, wherein the identification module is further configured to identify at least one region-of-interest (ROI) in the at least one of the plurality of feed frames based on a template from the plurality of templates, compared with the feed frame.

13. The logo recognition system as claimed in claim 10, wherein the identification module is further configured to:
 identify at least one ROI in a plurality of frames of at least one specimen videos;
 determine whether the pixels in each of the ROIs in the plurality of frames of the specimen videos are POIs or not; and
 create the plurality of templates based on the determination.

14. The logo recognition system as claimed in claim 10 further comprising a recording module coupled to and implemented by the processor, the recording module being for capturing a feed video.

15. The logo recognition system as claimed in claim 10 further comprising a quantization module coupled to and implemented by the processor, the quantization module configured to quantize colours of pixels in a region-of-interest (ROI) in each of the plurality of frames of a feed video.

* * * * *